H. C. MILLER.
LOOSE LEAF BINDER.
APPLICATION FILED NOV. 13, 1911.
1,056,926.
Patented Mar. 25, 1913.
2 SHEETS—SHEET 1.
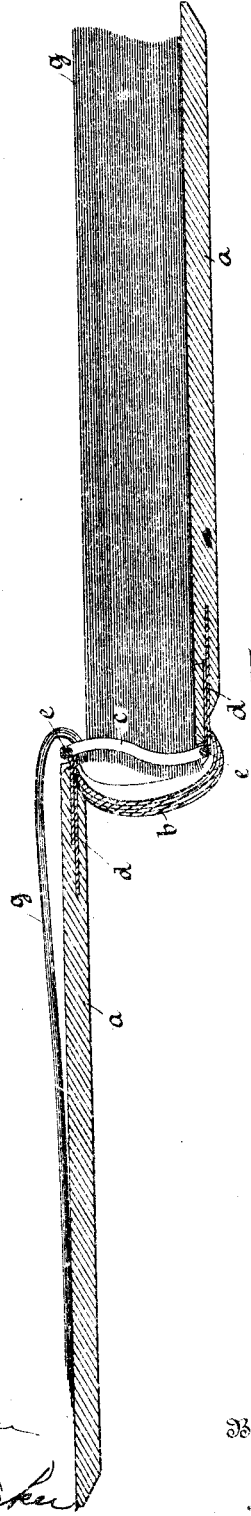
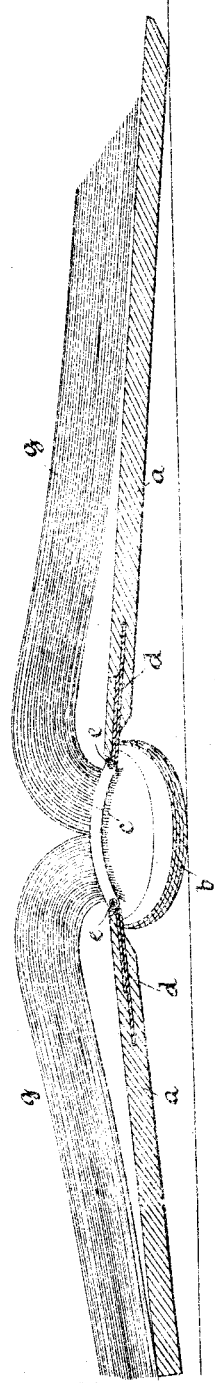
Witnesses
Florence Mallon
Frederick D. Tucker
Henry C. Miller, Inventor
By George Raymond Colby

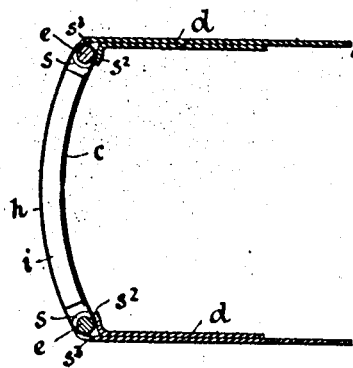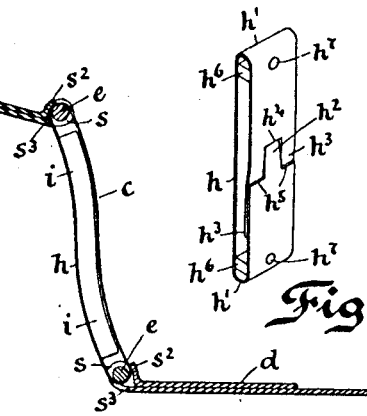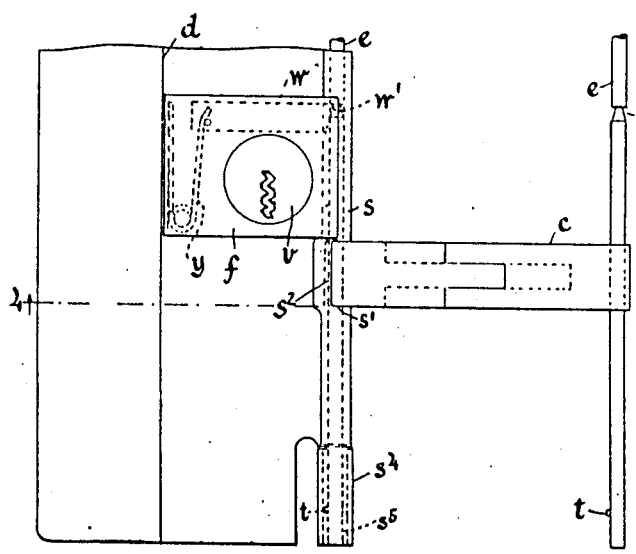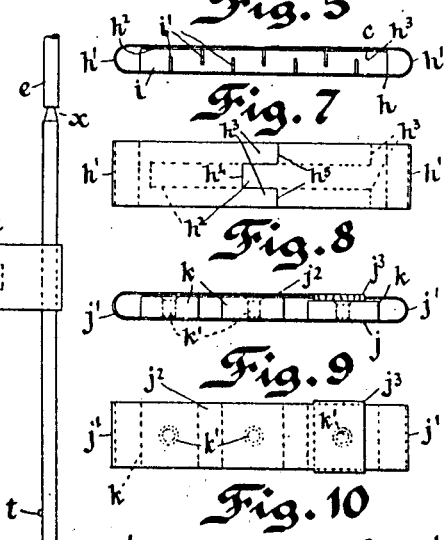

UNITED STATES PATENT OFFICE.

HENRY C. MILLER, OF MILWAUKEE, WISCONSIN.

LOOSE-LEAF BINDER.

1,056,926.  Specification of Letters Patent.  Patented Mar. 25, 1913.

Application filed November 13, 1911. Serial No. 659,962.

*To all whom it may concern:*

Be it known that I, HENRY C. MILLER, of Milwaukee, Wisconsin, have invented a Loose-Leaf Binder, of which the following is a specification.

This invention relates to loose-leaf binders of that class which are used more particularly for preserving documentary records which are recorded in public offices, such as real estate conveyances, assignments, corporation articles, etc. Such loose-leaf books are provided with a fixed number of leaves and a nonextensible cover and binding-posts, said binding-posts being detachably connected with the back at each side, and the mode of use being to remove successively the top leaves, copy the records thereupon and replace them serially in order in the back of the book. The loose-leaf system offers the great advantage, as well-known, of permitting the use of ordinary typewriting-machines to copy the records, but as heretofore carried out, it presents the disadvantage as compared with books having sewed bindings, that the leaves will not open flat, and this not only makes the handling of the book more difficult in examining records, but a large amount of space in the crotch or inside-edges of the leaves is lost, this space being moreover variable because it is deeper toward the center than toward the outside. A still further and important disadvantage of the loose-leaf system as heretofore carried out is the inflexibility of the binding, which makes it impossible to use a spring-back to advantage, and furthermore makes the cut of the edges at front and back either straight or convex toward the opening-side, which gives an uncouth and unpleasing appearance to the book when closed.

The object of my invention is therefore to improve the loose-leaf system as applied to such books, first by providing a special form of flexible binding-post, which will enable the leaves to assume a concave cut when closed and convex cut when opened, thus further enabling a spring-back to be used to advantage, and enabling the book to open more nearly flat; secondly to provide means for positively causing the posts to assume a concavely curved position when the book is closed and a convexly curved position when it is open; and thirdly to provide a locking-device for the fastening-rods which prevents removal of records from the binder.

My invention comprises in addition to the features above-named the special constructions and combinations which are hereinafter more fully described and set forth in my claims.

For the better understanding of the invention, I have illustrated the preferred form thereof together with several alternative forms of the details of construction in the accompanying drawings wherein—

Figure 1 is a transverse sectional view of a loose-leaf book constructed according to my invention, in the closed position; Fig. 2 is a similar view thereof with the top-cover opened; Fig. 3 is a similar view thereof open in the center, a portion on the left being broken away to bring it within the limits of the sheet; Fig. 4 is an end-view on a larger scale and in closed position of one of the flexible posts together with the hinge-portions of the binder which coöperate therewith, the latter sectioned on plane 4; Fig. 5 is a similar view of the same parts shown in the position assumed by them in opening the book; Fig. 6 is a face-view of one of the hinge-plates, one of the posts, and the opposite pintle-rod, to illustrate the locking-means; Figs. 7 and 8 are respectively a side and plan view of one form of my flexible post; Figs. 9 and 10 are respectively similar views of another form of post; Figs. 11 and 12 are respectively similar views of another form of post; Figs. 13 and 14 are respectively similar views of another form of post; Figs. 15 and 16 are respectively side and plan-views of a post-filler taken separately; and Fig. 17 is a perspective of another form of post.

The reference letters refer each to the same part in each figure of the drawings.

The book as shown in Figs. 1, 2 and 3 comprises covers *a*, a spring-back *b* hingedly connected to the covers by the usual flexible cloth or leather-hinge (omitted from the drawing); a plurality of flexible posts *c* constructed as hereinafter described and perforated at their ends; a pair of hinge-plates *d* embedded in the cover-material; a pair of pintle-rods *e* which connect the hinge-plates with the posts; a pair of locks *f* for locking said rods, these locks being embedded in the cover-material $a$ and therefore obscured in Figs. 1, 2 and 3; and a set of leaves $g$.

The posts $c$, various forms of which are illustrated separately in Figs. 7 to 13 inclusive, are so made as to have a sensible thickness sufficient to give them a certain amount of stiffness and prevent the edges from cutting the leaves, and yet have some flexibility enabling them to yield to lateral bending-force through limited angles, as shown in the drawings; and preferably also, they have a resiliency which brings them when released back to the straight position. To accomplish these aims I have devised and illustrated several special forms of this post. In Figs. 7 and 8 the post consists of a single strip $h$ of very thin spring-steel, which is bent at $h'$ $h'$ through two right-angles, so that the ends overlap upon the middle of the post, and said ends are cut into tongues $h^2$ and $h^3$ which interlock; to wit, one end has a single median tongue $h^2$, and the other has two marginal tongues $h^3$ leaving between them a space having the width of the tongue $h^2$; and the end of the tongue $h^2$ is thrust under the shoulder $h^4$, which lies between the tongues $h^3$, and the ends of the tongues $h^3$ are thrust under the shoulders $h^5$ which lie at the sides of the tongue $h^2$; so that there is no end projecting, which would be in danger of catching the perforations in the leaves, through which the post is thrust. It will be seen that the bends $h'$ form loops or eyes, through which the pintle-rods $c$ pass, and the stiffness of the metal holds the post normally straight, while at the same time its resiliency is allowed to act, because the end-portions $h^2$ and $h^3$ slide freely in and out when the post bends in one direction or the other.

In order to maintain the post of uniform thickness, and prevent it from collapsing or buckling in the center, it is preferable to insert between the two sides a filler $i$. This filler is made of any preferred flexible material, and may assume various forms; I have found a simple piece of leather of the proper thickness to be preferable. To increase the resiliency of the material, it may be provided with cuts $i'$ on alternately opposite sides extending part-way across, but this is not essential. Such a filler is illustrated separately in Figs. 15 and 16 inclusive. This filler is also applicable to the other forms shown, such as Figs. 11 and 17, but for greater simplicity and clearness, is omitted from these figures.

In Figs. 9 and 10 is shown a post similarly constructed and comprising a metal strip $j$ bent into loops $j'$ at the ends of the post and having the ends of the strip overlap; but instead of the overlapping tongues $h^2$, $h^3$ of Figs. 7 and 8, one end $j^2$ simply overlies the other, and is provided with a girth-strap $j^3$ passing around the other, whereby the end $j^2$ is held in position and prevented from projecting. In this form of post also I have shown a different form of filler, consisting of metal blocks $k$ which are spaced apart and are secured separately by rivets $k'$ to the lower side of the strip $j$ as shown.

In Figs. 11 and 12 I have shown a still different form of post comprising a single resilient strip of flat spring-steel $l$, a pair of end blocks $m$ perforated with apertures $m'$ for the pintles, and a pair of overlapping-strips $n$ and $o$, said overlapping-strips being secured to the blocks $m$ on the opposite sides thereof from the strip $l$ by means of the common rivets $p$. The strips $n$ and $o$ may interlock either as shown in Figs. 7 and 8 or as in Figs. 9 and 10, the former style of joint being illustrated in the drawing. This post is shown without any filler. In all these posts, as shown, the thickness of the metal is somewhat exaggerated for clearness sake.

Fig. 17 shows an improved form of the post illustrated in Fig. 7. The improvement consists in adding thereto a pair of blocks $h^6$ spaced sufficiently apart from the ends to permit of the pintle-rod passing in the open space between; and a pair of rivets $h^7$ which are passed through holes in the strip $h$ and the blocks $h^6$ and secure them firmly together. This prevents flattening of the ends caused by the pressure thereupon of the spring-back $b$.

Each of the posts above-described has resiliency as well as flexibility. That shown in Figs. 13 and 14 is made from a single strip of leather $q$ of the width and thickness of the post provided with looped metal-ends $r$ united thereto by rivets $r'$. The leather $q$ has flexibility, but little if any resiliency, and this form may conceivably be used with other materials which have both, but I have not found any which are very satisfactory in practice.

Considering now the mode of attachment of my improved post whereby it is caused to assume a curved position in one direction or the other according to the position of the book, the hinge-plates $d$ are provided with tubular sockets $s$, which are adapted to receive and hold frictionally the pintle-rods $c$, and said sockets are cut away opposite the place in which the end of the post fits, as plainly shown at $s'$ in Fig. 6. Now the metal on each side of the cut-away portion of the socket is so arranged as to abut against the post at a point on one side of the socket in the closed and open positions of the cover as shown in Figs. 4 and 5; the inner abutment $s^2$ abutting against the front face of the post in such manner as to limit its rotation on the pintle-rod to the position shown in Figs. 1 and 4, whereby when the book-covers are turned into parallel position, the post is forced into a rearwardly flexed position; and when one of the covers is turned through approximately 180 degrees or less, the other abutment $s^3$ strikes upon the rear side of the post, and further rotation flexes the post in the opposite direction, so that in this case it assumes the position shown in Figs. 2 and 5.

Now it will be clearly seen that when the book is closed, not only do the covers exert the aforesaid bending-action upon the post and thus positively force it toward the rear, but also the back-spring $b$ by compressing the covers has the same effect, and thus the book-leaves are forced to assume the curved cut at the front and back edges, which is appropriate thereto. Now when the book is opened, as in Fig. 3, the lever-action of the leaves tends to force the curve of the post in the opposite direction as shown, but in order to positively carry the curve of the post across the line of pressure of the springback, I provide the outer abutment $s^3$ which acts in opening one cover, as shown, to produce the double flexure indicated, and thus carry the curvature of the post to the outer side of said line of pressure. Thus it will be seen that while on the one hand the posts are in an up-and-down direction, absolutely rigid, and in the other direction possessed of sufficient stiffness to avoid any looseness or shakiness on the part of the leaves, yet at the same time the leaves are held firmly in their proper positions, and are positively moved in or out as the book is closed or opened, to give the proper concavity or convexity apropriate to the respective positions.

The bottom of the socket $s$ is enlarged as shown at $s^4$ so as to leave a free annular space $s^5$ surrounding the end of the pintlerod $e$ for the insertion of a tubular key (not here shown) which is provided with a bayonet slot or other device adapted to engage a lateral projection $t$ on the rod and pull it out. I provide means however for preventing unauthorized persons from removing the pintle-rods, said means comprising a flat lock $f$ mounted on the inside of each cover and provided with a tumbler-barrel $v$ adapted to be unlocked and rotated by a key to withdraw a reciprocating-bolt $w$, which has a beveled nose $w'$ adapted to engage the shoulder of an annular groove $w$ on the rod. The bolt $w$ is pressed resiliently into said engagement by means of a spring $y$. It will be readily seen that this allows the rod to be thrust in and locked without the key, but when so in place the rod cannot be withdrawn without first retracting the bolt $w$ by means of the key as aforesaid.

I wish it understood that my invention is not limited to the use of all the above described features and constructions, for some may be omitted and others may be varied or modified in various ways, as will readily occur to those skilled in the art.

Having thus described my invention, what I claim as new and desire to secure by Letters Patent is:

1. In combination with the covers and back hingedly connected, a post having at its ends means for pivotally uniting it with the covers at the hinged points thereof, said post being nonextensible and flexible in one plane only, means operated by the opening and closing of said covers for positively forcing said post into an inwardly bowed position when the covers are closed and into an outwardly bowed position when they are opened.

2. In combination with the covers and back hingedly connected, a post having at its ends means for pivotally uniting it with the covers at the hinged points thereof, said post being nonextensible and flexible in one plane only, and elements on said covers adjacent to the pivotal point of said post on opposite sides thereof, the innermost elements being adapted to abut against one side of the post and force it into an inward curvature when the covers are closed, and the outer element being adapted to abut against the opposite side of said post and force it into a reverse curvature when one of the covers is wide open.

3. In combination with a spring-back and swinging covers hingedly connected therewith and adapted to turn about their hinged axes with relation thereto, a non-extensible post inflexible in one plane and freely flexible in the plane at right angles thereto and having a length somewhat greater than the distance between its points of connection to the covers; said post being pivotally connected at its ends to said hinged covers and freely movable on its pivots; said covers having abutting edges on the opposite sides of the post which are adjacent to the pivots thereof and limit the angular movement of the post to a predetermined angle with relation to said covers.

4. In combination with a spring-back and covers hingedly connected thereto, a post having at its ends means pivotally uniting it with said hinged covers at a point near the hinged axis thereof; said post being nonextensible and flexible in one plane only and having a resiliency adapted to restore it to straightness when released.

5. In a loose-leaf book, the combination of a pair of hinge-plates having tubular sockets, pintle-rods seated in said sockets, one or more flexible posts having perforated ends through which said rods respectively pass, said ends being seated in recesses or cutaway portions of the sockets, and said cutaway portions having on either side thereof abutting-edges, of which the inner ones are adapted to abut against the front side of the post when the book is closed and force it to assume a rearward curvature, and the outer ones are adapted to abut against the rear sides of the post when one of the covers is wide open and force it to assume a reverse curvature.

6. In a loose-leaf book, the combination with the hinge-plates having tubular sockets, posts having perforated ends, and pintle-rods seated in and inclosed by said sockets and passing through said perforated ends, said pintle-rods having each a shouldered annular groove, of a pair of locks mounted on the inner sides of the respective covers and flush therewith, said locks having each a bolt adapted to engage in the shoulder of the corresponding pintle-rod and thereby prevent its withdrawal except by the operation of said lock.

7. In a loose-leaf book, the combination with the hinge-plates having tubular sockets, posts having perforated ends, and pintle-rods seated in and inclosed by said sockets and passing through said perforated ends, said pintle-rods having each a shouldered annular groove, of a pair of locks mounted on the inner sides of the respective covers and flush therewith, said locks having each a bolt adapted to engage in the shoulder of the corresponding pintle-rod and thereby prevent its withdrawal except by the operation of said lock, each lock having further a spring maintaining said bolt in an advanced position, and a circular tumbler-barrel adapted by rotation to retract said bolt.

8. As a new article of manufacture, a binder-post having eyes at its respective ends, a flat thin metal strap extending between said eyes on one side, a pair of overlapping and relatively slidable thin metal straps extending between the eyes on the other side, and one or more filling-pieces filling the space between said sides.

9. As a new article of manufacture, a binder-post having eyes at its respective ends, a flat thin metal strap extending between said eyes on one side, a pair of overlapping and relatively slidable thin metal straps extending between the eyes on the other side, and a piece of flexible material filling the space between said sides.

10. As a new article of manufacture, a binder-post having eyes at its respective ends, a flat thin metal strap extending between said eyes on one side, and a pair of overlapping and relatively slidable thin metal straps extending between the eyes on the other side, the ends of said last-named straps being slidably confined by each other whereby they are prevented from projecting.

11. As a new article of manufacture, a binder-post having eyes at its respective ends, a flat thin metal strap extending between said eyes on one side, and a pair of overlapping and relatively slidable thin metal straps extending between the eyes on the other side, the ends of said last-named straps having interlocking tongues, the tongue or tongues on one member passing between the tongue or tongues on the other member, and the tongues on each member underlying the body of the strap on the other member.

12. As a new article of manufacture, a freely flexible nonextensible binder-post for binders of the class described, said post comprising a single thin sheet-metal strap bent into eyes at two points corresponding to the ends of the post, the ends of said strap overlapping each other on the opposite side of the post from the middle portion of said strap, and each end having a connection with the strap which confines it closely thereto.

13. As a new article of manufacture, a freely flexible nonextensible binder-post for binders of the class described, said post comprising a single thin sheet-metal strap bent into eyes at the two points corresponding to the ends of the post, the ends of said strap overlapping each other on the opposite side of the post from the middle portion of said strap, each end of said strap being provided with one or more tongues, the tongues on one end alternating with those on the other and the tongue or tongues on each end being disposed below and confined by the body of the metal on the other end of the strap.

14. As a new article of manufacture, a freely flexible nonextensible binder-post for binders of the class described, said post comprising a single thin sheet-metal strap bent into semi-circular eyes at the two points corresponding to the ends of the post, the ends of said strap overlapping each other on the opposite side of the post from the middle portion of said strap, each end of said strap being provided with one or more tongues, the tongues on one end alternating with those on the other and the tongue or tongues on each end being disposed below and confined by the body of the metal on the other end of the strap, and one or more spacing-pieces disposed in the open space between the two sides of the post.

15. As a new article of manufacture, a freely flexible nonextensible binder-post for binders of the class described, said post comprising a single thin sheet-metal strap bent into semi-circular eyes at the two points corresponding to the ends of the post, the ends of said strap overlapping each other on the opposite side of the post from the middle portion of said strap, each end of said strap being provided with one or more tongues, the tongues on one end alternating with those on the other, and the tongue or tongues on each end being disposed below and confined by the body of the metal on the other end of the strap, and a flexible spacing-piece disposed along the median portion of the post between the two ends and the two sides thereof.

16. As a new article of manufacture, a freely flexible nonextensible binder-post for binders of the class described, said post comprising a single thin sheet-metal strap bent into eyes at two points corresponding to the ends of the post, the ends of said strap overlapping each other on the opposite side of the post from the middle portion of said strap, a pair of blocks inserted between the sides of said post a short distance from the respective ends, and a pair of rivets passing through both sides of the post and the respective blocks and binding them together.

17. As a new article of manufacture, a freely flexible nonextensible binder-post for binders of the class described, said post comprising a single thin sheet-metal strap bent into eyes at two points corresponding to the ends of the post, the ends of said strap overlapping each other on the opposite side of the post from the middle portion of said strap, a pair of blocks inserted between the sides of said post a short distance from the respective ends, and a pair of rivets passing through both sides of the post and the respective blocks and binding them together, and one or more spacing-pieces disposed in the open space between the two sides of the post.

18. As a new article of manufacture, a freely flexible nonextensible binder-post for binders of the class described, said post comprising a single thin sheet-metal strap bent into eyes at two points corresponding to the ends of the post, the ends of said strap overlapping each other on the opposite side of the post from the middle portion of said strap, a block inserted between the sides of said post a short distance from one of its ends, and a fastening-device securing both sides of said post and the block together.

19. As a new article of manufacture, a freely flexible non-extensible binder-post for binders of the class described, said post comprising a looped metal strap, the looped ends forming eyes adapted to turn upon pintles carried by the binder, means extending across the post from one side to the other on each end and shutting off the eye-opening from the middle portion of the post whereby the pintle is prevented from running down toward the center of the post.

In witness whereof I have hereunto set my hand in the presence of two witnesses.

HENRY C. MILLER.

Witnesses:
JUSTUS CAHN,
FERDINAND KNUPE, Jr.

Copies of this patent may be obtained for five cents each, by addressing the "Commissioner of Patents, Washington, D. C."